(12) United States Patent
Hearn et al.

(10) Patent No.: US 9,676,051 B2
(45) Date of Patent: Jun. 13, 2017

(54) SYSTEM AND METHODS PROVIDING MODULATION SCHEMES FOR ACHIEVING A WELD BEAD APPEARANCE

(71) Applicant: Lincoln Global, Inc., City of Industry, CA (US)

(72) Inventors: James E. Hearn, Brunswick, OH (US); Joseph A. Daniel, Sagamore Hills, OH (US); Tamara Savrin, Orange Village, OH (US); Steven R. Peters, Huntsburg, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 564 days.

(21) Appl. No.: 13/777,343

(22) Filed: Feb. 26, 2013

(65) Prior Publication Data

US 2014/0110385 A1  Apr. 24, 2014

Related U.S. Application Data

(60) Provisional application No. 61/715,557, filed on Oct. 18, 2012.

(51) Int. Cl.
   *B23K 9/10*  (2006.01)
   *B23K 9/09*  (2006.01)
   (Continued)

(52) U.S. Cl.
   CPC ............ *B23K 9/1006* (2013.01); *B23K 9/091* (2013.01); *B23K 9/095* (2013.01); *B23K 9/1043* (2013.01); *B23K 9/173* (2013.01)

(58) Field of Classification Search
   CPC ...... B23K 9/091; B23K 9/095; B23K 9/1006; B23K 9/1043; B23K 9/173
   (Continued)

(56) References Cited

U.S. PATENT DOCUMENTS

| | | | | |
|---|---|---|---|---|
| 2,871,339 A | * | 1/1959 | Jackson | B23K 9/173 219/137 R |
| 2,876,330 A | * | 3/1959 | Reinhardt | B23K 9/04 219/137 R |

(Continued)

FOREIGN PATENT DOCUMENTS

| | | |
|---|---|---|
| EP | 0972604 | 1/2000 |
| EP | 2455177 | 5/2012 |

(Continued)

OTHER PUBLICATIONS

PCT/IB2013/002330—International Search Report and Written Opinion of the International Searching Authority mailed Aug. 13, 2014.

(Continued)

*Primary Examiner* — Dana Ross
*Assistant Examiner* — Ket D Dang
(74) *Attorney, Agent, or Firm* — Perkins Coie LLP

(57) ABSTRACT

Systems and methods for affecting an appearance of a deposited weld bead by modulating one or more welding parameters. For example, an electrode negative portion of a welding output current may be modulated to affect the appearance of a deposited weld bead. Furthermore, a wire feed speed of a welding electrode may be synergistically modulated with an electrode negative portion of a welding output current to affect a deposited weld bead appearance. Two or more welding processes may be interleaved with each other at a specified modulation frequency to affect a deposited weld bead appearance. One or more welding parameters may be modulated based on a welding travel speed to provide a consistent appearance of a deposited weld bead.

24 Claims, 6 Drawing Sheets

(51) Int. Cl.
*B23K 9/095* (2006.01)
*B23K 9/173* (2006.01)

(58) Field of Classification Search
USPC ....... 219/130.1, 130.51, 130.32, 136, 137 R, 219/137 PS, 137.2, 130.31, 124.02, 219/124.03, 125.12, 130.21, 130.33
See application file for complete search history.

(56) References Cited

U.S. PATENT DOCUMENTS

| | | | | |
|---|---|---|---|---|
| 3,409,756 A | * | 11/1968 | Manz | 219/137.7 |
| 3,956,610 A | * | 5/1976 | Kanbe et al. | 219/137 PS |
| 4,186,864 A | * | 2/1980 | Ishimaru | B23K 33/004 219/137 R |
| 4,427,874 A | * | 1/1984 | Tabata et al. | 219/130.51 |
| 4,507,543 A | * | 3/1985 | Ukai et al. | 219/137 PS |
| 4,595,820 A | * | 6/1986 | Richardson | B23K 9/0956 219/130.01 |
| 4,897,523 A | * | 1/1990 | Parks | B23K 9/125 219/130.21 |
| 5,508,493 A | * | 4/1996 | Ueyama et al. | 219/130.51 |
| 5,667,709 A | * | 9/1997 | Ueyama | B23K 9/091 219/130.51 |
| 5,780,804 A | * | 7/1998 | White | B23K 9/0061 219/121.43 |
| 6,087,627 A | * | 7/2000 | Kramer | B23K 9/095 219/130.21 |
| 6,118,098 A | * | 9/2000 | Amos | B23K 9/04 219/121.11 |
| 6,335,511 B1 | * | 1/2002 | Rothermel | B23K 9/091 219/124.03 |
| 6,515,259 B1 | * | 2/2003 | Hsu et al. | 219/130.51 |
| 6,700,097 B1 | | 3/2004 | Hsu et al. | |
| 6,858,813 B1 | | 2/2005 | Keller et al. | |
| 6,930,279 B2 | | 8/2005 | Myers et al. | |
| 7,235,760 B2 | | 6/2007 | Tong et al. | |
| 7,358,459 B2 | * | 4/2008 | Stava | 219/130.51 |
| 7,800,016 B2 | | 9/2010 | Era et al. | |
| 8,613,139 B2 | * | 12/2013 | Flesch et al. | 29/889.2 |
| 9,073,140 B2 | * | 7/2015 | Hearn et al. | |
| 2006/0283848 A1 | * | 12/2006 | Karogal | B23K 9/1735 219/145.22 |
| 2007/0181553 A1 | | 8/2007 | Stanzel et al. | |
| 2008/0237208 A1 | | 10/2008 | Era et al. | |
| 2011/0204034 A1 | | 8/2011 | Schartner et al. | |
| 2012/0199567 A1 | | 8/2012 | Nakagawa et al. | |
| 2012/0241429 A1 | | 9/2012 | Knoener et al. | |
| 2012/0303175 A1 | | 11/2012 | Lambert et al. | |

FOREIGN PATENT DOCUMENTS

| | | | |
|---|---|---|---|
| JP | 57168775 | | 10/1982 |
| JP | 04333368 A | * | 11/1992 |
| JP | 05337650 A | * | 12/1993 |
| WO | 03076114 | | 9/2003 |
| WO | 2006089322 | | 8/2006 |
| WO | 2007053137 | | 5/2007 |
| WO | 2008045584 | | 4/2008 |
| WO | 2011157289 A1 | | 12/2011 |

OTHER PUBLICATIONS

PCT/IB2013/002330—International Preliminary Report on Patentability and Written Opinion of the International Searching Authority mailed Apr. 30, 2015.

* cited by examiner

SYSTEM AND METHODS PROVIDING MODULATION SCHEMES FOR ACHIEVING A WELD BEAD APPEARANCE

This U.S. patent application claims priority to and the benefit of U.S. provisional patent application Ser. No. 61/715,557 filed on Oct. 18, 2012, which is incorporated herein by reference in its entirety.

TECHNICAL FIELD

Certain embodiments of the present invention relate to arc welding. More particularly, certain embodiments of the present invention relate to systems and methods providing for the modulation of one or more welding parameters to achieve a specified weld bead appearance.

BACKGROUND

Certain prior art welding systems use limited techniques and/or rely on the welding operator to achieve a desired weld bead appearance of a weld. As a result, the ability to consistently achieve a desired weld bead appearance may be restricted and may require significant training and experience of the welder.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

In certain welding applications (e.g., metal inert gas or MIG welding of aluminum), it may be desirable to lay down a weld bead having a stacked dime appearance. Such a stacked dime appearance is well known in the art and may provide enhanced metallurgical characteristics such as, for example, reduced porosity and improved grain structure. However, the ability to create such a stacked dime appearance is not always straightforward, and may require much skill and experience by the welder. Systems and methods providing for the modulation of one or more welding parameters to achieve a desired weld bead appearance (e.g., a stacked dime appearance) are disclosed. For example, two are more welding parameters may be synergistically modulated to achieve the desired weld bead appearance.

In one embodiment of the present invention, an electrode negative portion of a welding process is modulated to achieve a specified weld bead appearance. An arc welding power source for generating an arc between a consumable welding electrode and a welding workpiece is provided. The power source includes a switching power supply, a waveform generator, and a controller operatively connected to the waveform generator and the switching power supply. The controller, the waveform generator, and the switching power supply are configured to generate a cyclical welding output current having an electrode positive portion and an electrode negative portion. At least one characteristic of the electrode negative portion may be modified at a modulation frequency to affect an appearance of a deposited weld bead from a consumable welding electrode onto a workpiece during a welding process. Alternatively, at least one characteristic of the electrode positive portion may be modified at a modulation frequency to affect an appearance of a deposited weld bead from a consumable welding electrode onto a workpiece during a welding process. The at least one characteristic of the electrode negative portion or the electrode positive portion may be modified at the modulation frequency to affect cycling between a first weld energy input state and a second weld energy input state providing more energy than the first weld energy input state. The at least one characteristic of the electrode negative portion or the electrode positive portion of the welding output current may include one or more of an amplitude, a duration or pulse width, a rising edge slope, a falling edge slope, or a shape. In accordance with an embodiment, the welding process may be an aluminum or an aluminum alloy gas metal arc welding (GMAW) process.

In one embodiment of the present invention, a combination of electrode negative modulation and wire feed speed (WFS) modulation is used to achieve a specified weld bead appearance. An arc welding system for generating an arc between a consumable welding electrode and a welding workpiece is provided. The system includes a power source configured to provide a welding output current to generate an arc between a consumable welding electrode and a welding workpiece and a wire feeder configured to feed the consumable welding electrode toward the welding workpiece. The power source is configured to command the wire feeder to operate at a wire feed speed and to generate a cyclical welding output current having an electrode positive portion and an electrode negative portion. The power source is further configured to vary at least one characteristic of the electrode negative portion and the wire feed speed in a correlated manner at a modulation rate to affect an appearance of a deposited weld bead from the consumable electrode onto the workpiece during a welding process. Alternatively, the power source may be configured to vary at least one characteristic of the electrode positive portion and the wire feed speed in a correlated manner at a modulation rate. The at least one characteristic of the electrode negative portion or the electrode positive portion may be varied at the modulation rate to affect cycling between a first weld energy input state and a second weld energy input state providing more energy than the first weld energy input state. The first weld energy input state may occur during times of a first wire feed speed, and the second weld energy input state may occur during times of a second wire feed speed, wherein the second wire feed speed is faster than the first wire feed speed. The at least one characteristic of the electrode negative portion or the electrode positive portion of the welding output current may include one or more of an amplitude, a duration or pulse width, a rising edge slope, a falling edge slope, or a shape. In accordance with an embodiment, the welding process is an aluminum or an aluminum alloy gas metal arc welding (GMAW) process.

In one embodiment of the present invention, a combination of a short arc welding process and a pulse welding process is used to achieve a specified weld bead appearance. An arc welding power source for generating an arc between a consumable welding electrode and a welding workpiece is provided. The power source includes a switching power supply, a waveform generator, and a controller operatively connected to the waveform generator and the switching power supply. The controller, the waveform generator, and the switching power supply are configured to generate a welding output current that cycles between a short arc welding process and a pulse welding process at a modulation frequency to affect an appearance of a deposited weld bead from a consumable welding electrode onto a workpiece. The pulse welding process may be a higher heat transfer welding process than the short arc welding process, in accordance with an embodiment. Furthermore, the controller may be configured to change the modulation frequency to affect a resultant heat input to a weld.

In one embodiment, the modulation of one or more welding parameters to achieve a specified weld bead appearance is correlated to the travel speed of an arc welding tool. An arc welding system for generating an arc between a consumable welding electrode and a welding workpiece is provided. The system includes a power source configured to provide a cyclical welding output current to generate an arc between a consumable welding electrode and a welding workpiece, a wire feeder operatively connected to the power source and configured to feed the consumable welding electrode at a wire feed speed, and a welding tool operatively connected to the wire feeder to accept the consumable welding electrode and direct the consumable welding electrode toward the welding workpiece. The power source is configured to command a modification of the wire feed speed and at least a portion of the cyclical welding output current in a synergistic manner at a modulation rate based on a selected travel speed of the welding tool to affect an appearance of a deposited weld bead from the consumable welding electrode onto the workpiece. The portion of the cyclical welding output current may be an electrode negative portion or an electrode positive portion. The modulation frequency may increase or decrease as the travel speed changes, for example. The wire feed speed may increase or decrease as the travel speed changes, for example.

In one embodiment of the present invention, an arc welding power source is provided for generating an arc between a consumable welding electrode and a welding workpiece. The power source is configured to adjust a modulation frequency at which one or more welding parameters is modified based on a welding travel speed to achieve a consistent appearance of a deposited weld bead from the consumable welding electrode onto the workpiece. The one or more welding parameters may include one or more of an amplitude of a welding output current, a pulse width of a welding output current, a rising edge slope of a welding output current, a falling edge slope of a welding output current, or a shape of a welding output current waveform. The modulation frequency may increase or decrease as the welding travel speed increases, for example.

Details of illustrated embodiments of the present invention will be more fully understood from the following description and drawings.

DETAILED DESCRIPTION

Figure 1:
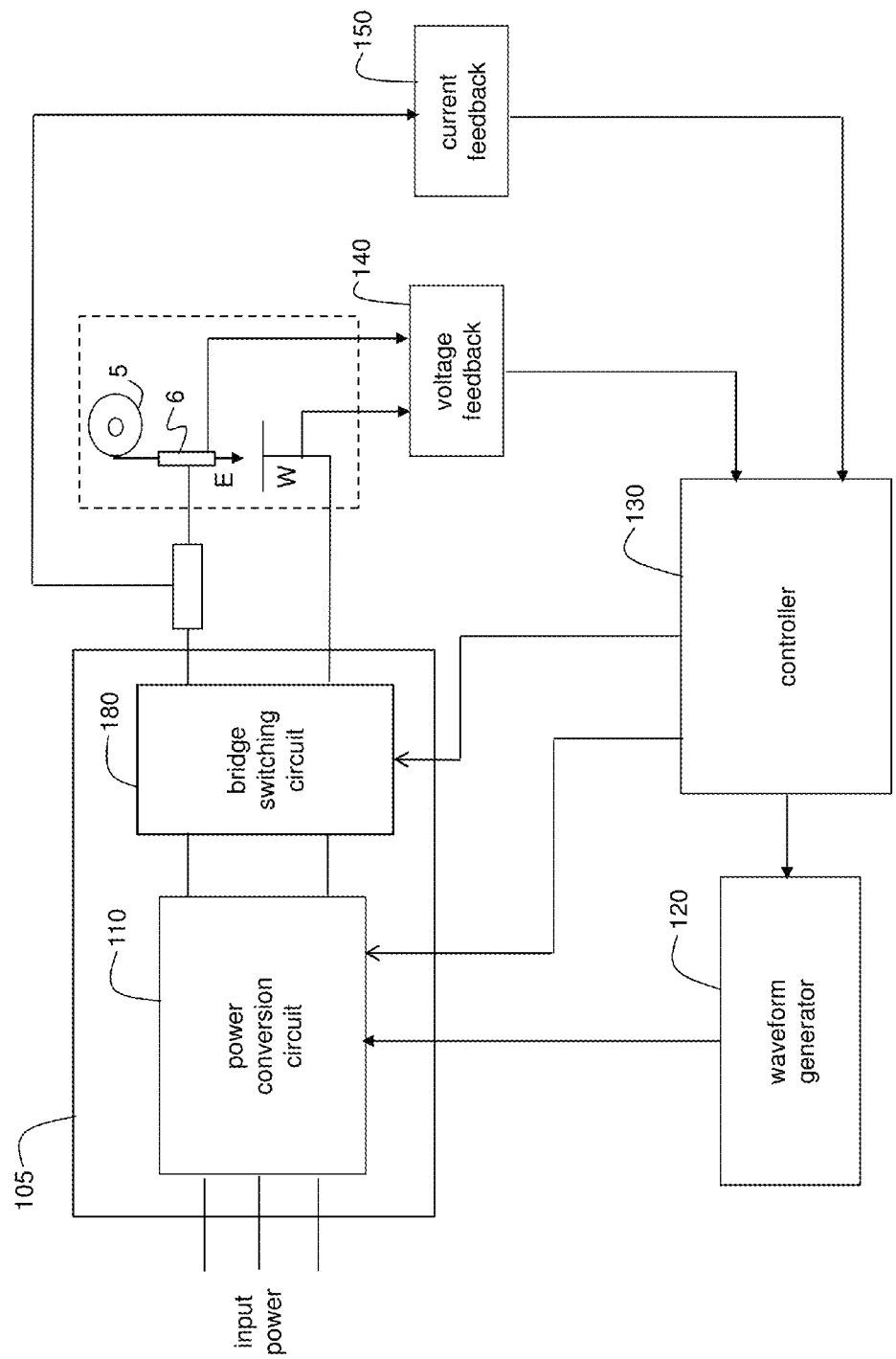
FIG. 1 illustrates a schematic block diagram of an exemplary embodiment of an arc welding system operatively connected to a consumable welding electrode and a workpiece.

The following are definitions of exemplary terms that may be used within the disclosure. Both singular and plural forms of all terms fall within each meaning:

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk.

"Welding tool", as used herein, refers to, but is not limited to, a welding gun, a welding torch, or any welding device that accepts a consumable welding wire for the purpose of applying electrical power to the consumable welding wire provided by a welding power source.

"Welding output circuit path", as used herein, refers to the electrical path from a first side of the welding output of a welding power source, through a first welding cable (or a first side of a welding cable), to a welding electrode, to a workpiece (either through a short or an arc between the welding electrode and the workpiece), through a second welding cable (or a second side of a welding cable), and back to a second side of the welding output of the welding power source.

"Welding cable", as used herein, refers to the electrical cable that may be connected between a welding power source and a welding electrode and workpiece (e.g. through a welding wire feeder) to provide electrical power to create an arc between the welding electrode and the workpiece.

"Welding output", as used herein, may refer to the electrical output circuitry or output port or terminals of a welding power source, or to the electrical power, voltage, or current provided by the electrical output circuitry or output port of a welding power source.

"Computer memory", as used herein, refers to a storage device configured to store digital data or information which can be retrieved by a computer or processing element.

"Controller", as used herein, refers to the logic circuitry and/or processing elements and associated software or program involved in controlling a welding power source.

The terms "signal", "data", and "information" may be used interchangeably herein and may be in digital or analog form.

The term "AC welding" is used generally herein and may refer to actual AC welding, DC welding in both positive and negative polarities, variable polarity welding, and other hybrid welding processes.

The term "welding parameter" is used broadly herein and may refer to characteristics of a portion of a welding output current waveform (e.g., amplitude, pulse width or duration, slope, electrode polarity), a welding process (e.g., a short arc welding process or a pulse welding process), wire feed speed, a modulation frequency, or a welding travel speed.

The terms "modulation" and "modulate" as used herein may refer to the modification of, the changing of, or the varying of a welding parameter at a defined rate or frequency with a defined duty cycle.

The term "energy output state" is from the point of view of a welding power source and the term "energy input state" is from the point of view of a weld, as used herein, even though the terms may be essentially equivalent and used interchangeably herein.

FIG. 1 illustrates a schematic block diagram of an exemplary embodiment of an arc welding system 100 operatively connected to a consumable welding electrode and a workpiece. The system 100 includes a switching power supply 105 having a power conversion circuit 110 and a bridge switching circuit 180 providing welding output power between the welding electrode E and the workpiece W. The power conversion circuit 110 may be transformer based with a half bridge output topology. For example, the power conversion circuit 110 may be of an inverter type that includes an input power side and an output power side, for example, as delineated by the primary and secondary sides, respectively, of a welding transformer. Other types of power conversion circuits are possible as well such as, for example, a chopper type having a DC output topology. The switching power supply 105 also includes a bridge switching circuit 180 that is operatively connected to the power conversion circuit 110 and is configured to switch a direction of the polarity of the welding output current (e.g., for AC welding).

The system 100 further includes a waveform generator 120 and a controller 130. The waveform generator 120 generates welding waveforms at the command of the controller 130. A waveform generated by the waveform generator 120 modulates the output of the power conversion circuit 110 to produce the welding output current between the electrode E and the workpiece W. The controller 130 also commands the switching of the bridge switching circuit 180 and may provide control commands to the power conversion circuit 110 during a welding process.

The system 100 may further include a voltage feedback circuit 140 and a current feedback circuit 150 to monitor the welding output voltage and current between the electrode E and the workpiece W and provide the monitored voltage and current back to the controller 130. The feedback voltage and current may be used by the controller 130 to make decisions with respect to modifying the welding waveform generated by the waveform generator 120 and/or to make other decisions that affect operation of the system 100, for example. In accordance with an embodiment, the controller 130 is used to control a modulation frequency at which one or more welding parameters are varied to affect an appearance of a deposited weld bead from the consumable welding electrode onto the workpiece.

In accordance with an embodiment, the switching power supply 105, the waveform generator 120, the controller 130, the voltage feedback circuit 140, and the current feedback circuit 150 constitute a welding power source of the system 100. The system 100 also includes a wire feeder 5 that feeds the consumable wire welding electrode E toward the workpiece W through a welding tool 6. The wire feeder 5, the welding tool 6, the consumable welding electrode E, and the workpiece W are not part of the welding power source but may be operatively connected to the welding power source 100 via one or more welding output cables.

Figure 2:
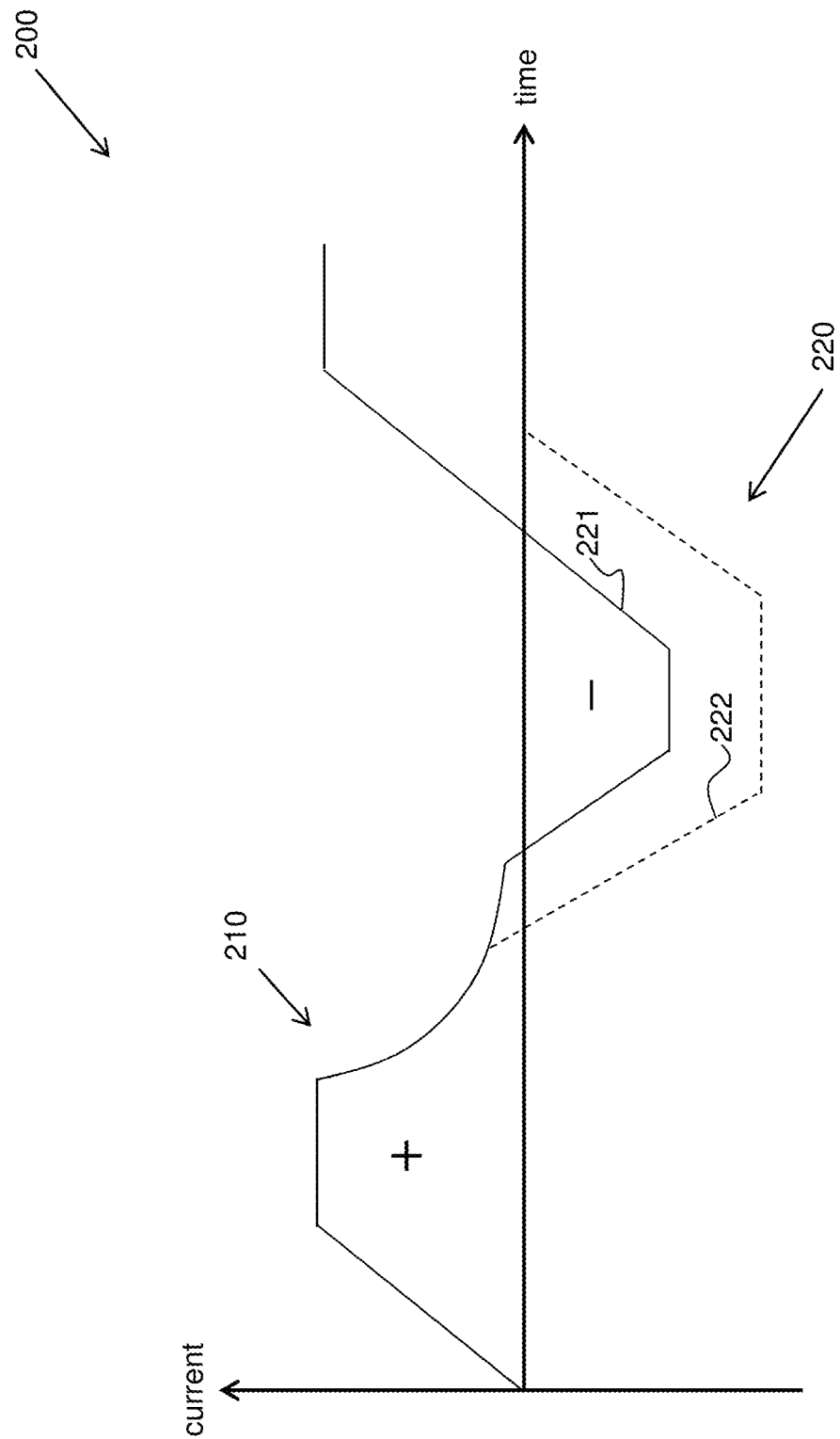
FIG. 2 illustrates an exemplary embodiment of a welding output current waveform having an electrode positive portion and a modulated electrode negative portion for affecting an appearance of a deposited weld bead.

FIG. 2 illustrates an exemplary embodiment of an AC welding output current waveform 200 having an electrode positive portion 210 and a modulated electrode negative portion 220 for affecting an appearance of a deposited weld bead. Under the command of the controller 130, the electrode negative portion of the waveform 200 may be varied between a lower energy output state 221 and a higher energy output state 222. For example, the electrode negative portion 220 providing the lower energy output state 221 may be produced for x consecutive waveform cycles (e.g., ten waveform cycles) followed by the higher energy output state 222 for y consecutive waveform cycles (e.g., five waveform cycles). The process repeats at some defined modulation rate. Therefore, the electrode negative portion 220 is changed back and forth between low energy and high energy states at the modulation rate.

Figure 6:
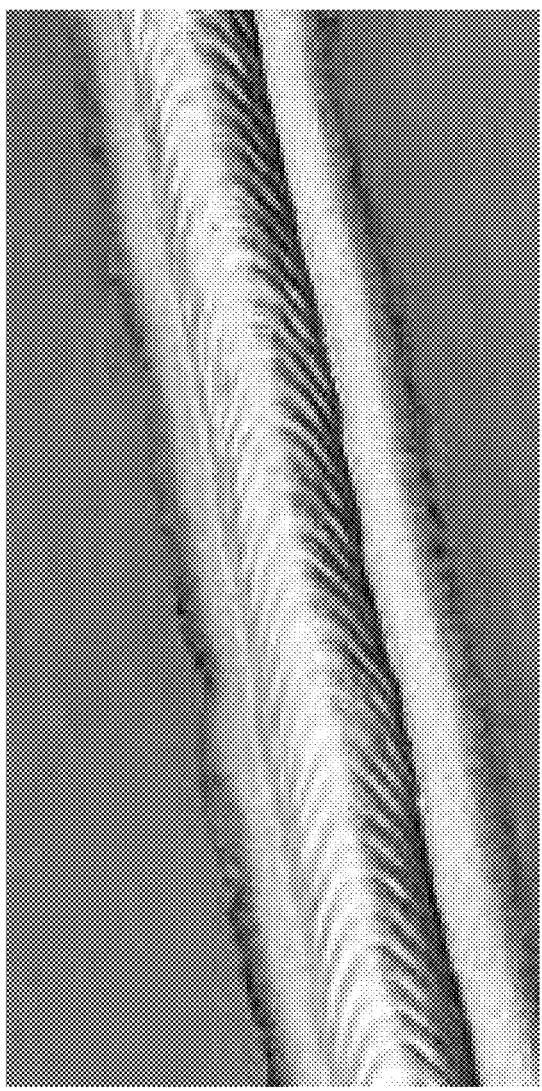
FIG. 6 illustrates an example of an aluminum weld bead having a stacked dime appearance.

The melting rate of the electrode weld material changes as the ratio of electrode positive energy to electrode negative energy changes by modulating the electrode negative energy. For example, the wire electrode E may melt faster during the electrode negative portion of the welding output current waveform 200. Such modulation of the electrode negative portion of the welding output current may result in a desired deposited weld bead appearance (e.g., a stacked dime appearance when the welding application is an aluminum or aluminum alloy MIG welding application). FIG. 6 illustrates an example of an aluminum weld bead 600 having a stacked dime appearance.

The electrode negative portion 220 of the welding output current waveform 200 may be modulated in various ways. In FIG. 2, the amplitude and duration or pulse width of the electrode negative portion 220 is varied. Other parameters or characteristics may also be varied such as, for example, the falling and rising slopes of the electrode negative portion 220, or the overall shape of the electrode negative portion 220.

Figure 3:
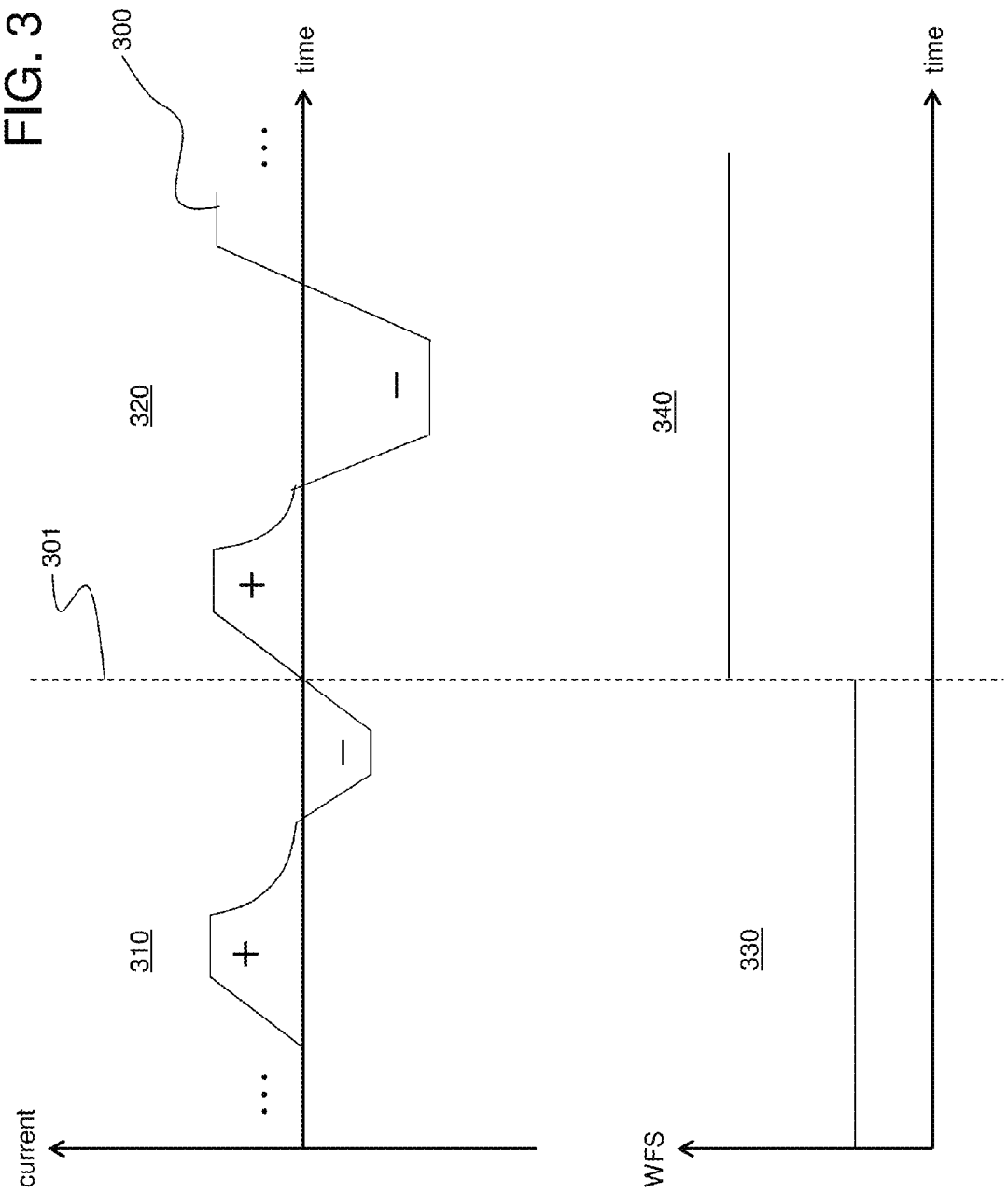
FIG. 3 illustrates an exemplary embodiment of synergistically modulating wire feed speed and a welding output current waveform to affect an appearance of a deposited weld bead.

FIG. 3 illustrates an exemplary embodiment of synergistically modulating wire feed speed and a welding output current waveform to affect an appearance of a deposited weld bead. The top portion of FIG. 3 shows the transition 301 between waveform cycles of a welding output current 300 having a low energy electrode negative portion 310 and waveform cycles of the welding output current 300 having a high energy electrode negative portion 320. That is, the electrode negative portion of the welding output current 300 is modulated at some defined modulation rate. The lower portion of FIG. 3 shows the transition 301 between a low wire feed speed portion 330 and a high wire feed speed portion 340 of the welding electrode wire E as fed by the wire feeder 5. That is, the wire feed speed is modulated at some defined modulation rate (the process repeats at the modulation rate).

In accordance with an embodiment, the low wire feed speed portion 330 is correlated to the low energy electrode negative portion 310 of the welding output current 300, and the high wire feed speed portion 340 is correlated to the high energy electrode negative portion 320 of the welding output current 300. Therefore, the modulation rate of the welding output current 300 and the wire feed speed are the same and in synchronization. Such modulation of the electrode negative portion 310 of the welding output current 300 and the wire feed speed may result in a desired deposited weld bead appearance (e.g., a stacked dime appearance when the welding application is an aluminum or aluminum alloy MIG welding application; e.g., see the stacked dime bead appearance of FIG. 6).

Figure 4:
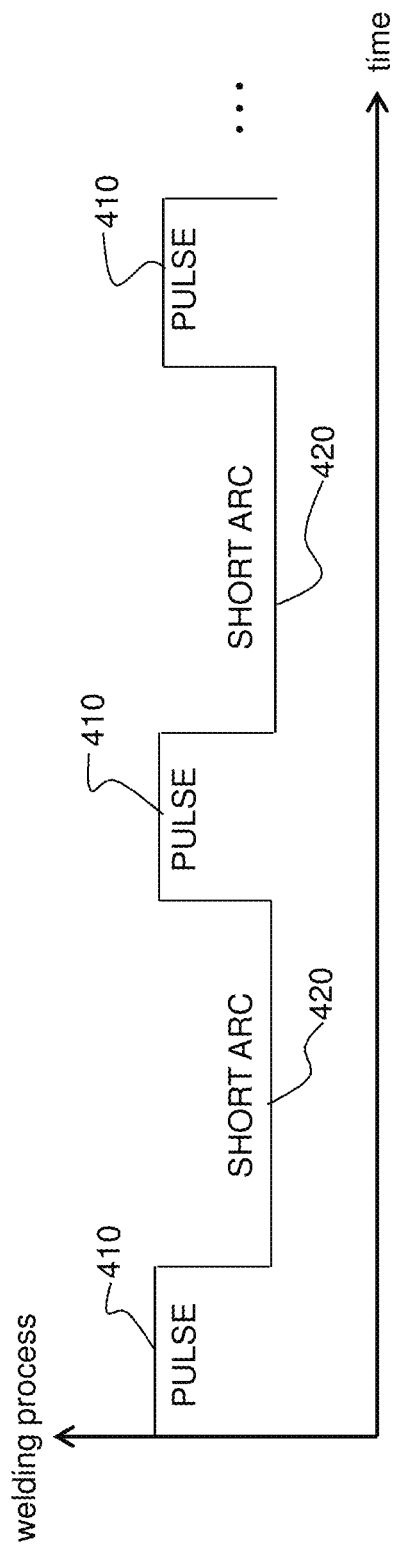
FIG. 4 illustrates an exemplary embodiment of cycling between two welding processes to affect an appearance of a deposited weld bead.

FIG. 4 illustrates an exemplary embodiment of cycling between two welding processes to affect an appearance of a deposited weld bead. For example, in FIG. 4, the welding process cycles between cycles (e.g., ten cycles) of a pulse welding process 410 and cycles (e.g., fifteen cycles) of a short arc welding process 420 at some defined modulation rate. Pulse welding processes and short arc welding processes are well known in the art. The cycling between the two welding processes at the modulation rate is under the control of the controller 130, in accordance with an embodiment. The pulse welding process 410 may provide a high heat transfer of welding droplets across the arc between the electrode E and the workpiece W. The short arc welding process 420 may provide a low heat transfer of welding droplets from the electrode E to the workpiece W by shorting the electrode E to the workpiece W. The modulation rate may be controlled to control the resultant heat input into the weld. Such modulation of welding processes may result in a desired deposited weld bead appearance (e.g., a stacked dime appearance when the welding application is a silicon bronze or aluminum MIG welding application). Other low heat and high heat welding processes may be cycled between as well, in accordance with other embodiments.

Figure 5:
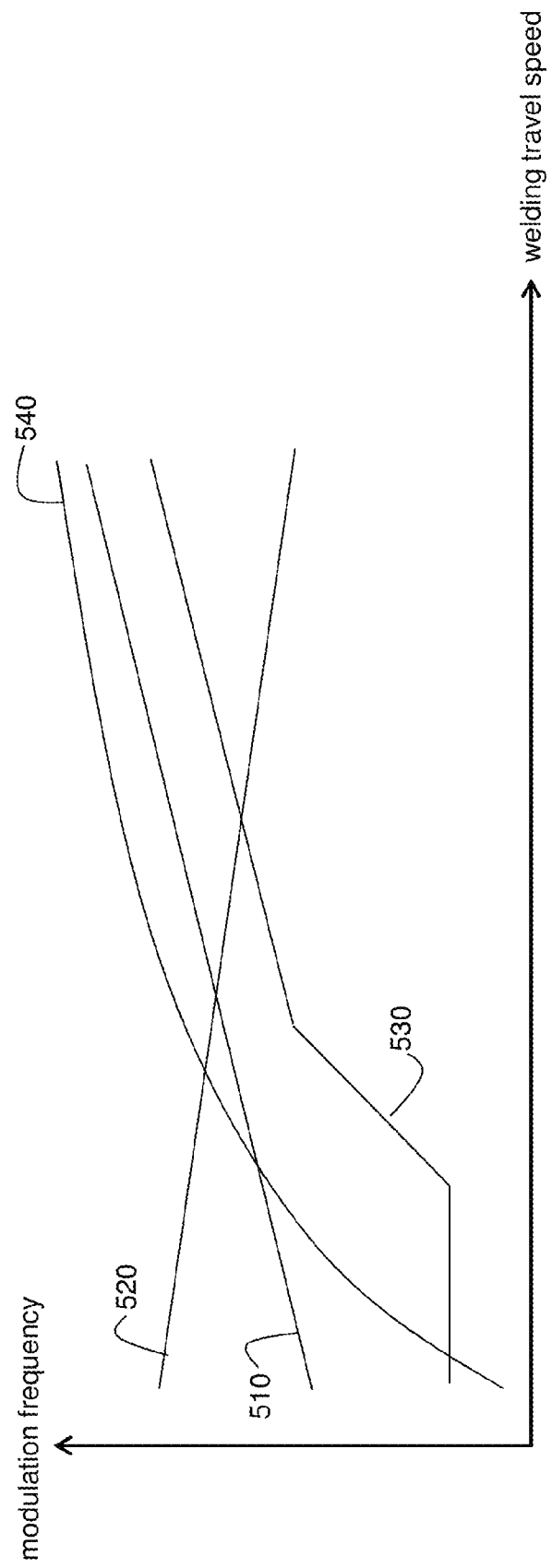
FIG. 5 illustrates an exemplary embodiment of how a welding power source may adjust a modulation frequency of one or more welding parameters based on a welding travel speed to achieve a consistent appearance of a deposited weld bead.

FIG. 5 illustrates an exemplary embodiment of how a welding power source may adjust a modulation rate or frequency of one or more welding parameters based on a welding travel speed to achieve a consistent appearance of a deposited weld bead. Welding travel speed corresponds to the speed that a welder (or mechanized device) moves a welding tool along a weld path to deposit a weld bead from a consumable electrode. The one or more welding parameters being modulated may include, for example, a electrode negative portion of a welding output current (e.g., amplitude and duration), a wire feed speed, or a welding process (e.g., short arc and pulse). Other welding parameters may be possible to modulate as well, in accordance with various embodiments.

As an example, modulation frequency may vary directly and linearly with respect to welding travel speed as shown in graph 510 of FIG. 5. Alternatively, modulation frequency may vary inversely and linearly with respect to welding travel speed as shown in graph 520 of FIG. 5. As another example, modulation frequency may vary in a piece-wise linear manner with respect to welding travel speed as shown in graph 530 of FIG. 5. As a final example, modulation frequency may vary non-linearly with respect to welding travel speed as shown in graph 540 of FIG. 5. In accordance with an embodiment, two or more welding parameters may be correlated or synchronized to each other, varying in accordance with the same modulation frequency.

Such varying of the modulation frequency of one or more welding parameters as welding travel speed changes may result in a consistent deposited weld bead appearance (e.g., a stacked dime appearance when the welding application is a nickel or nickel alloy MIG welding application). Other relationships between modulation frequency and welding travel speed are possible as well, in accordance with other embodiments.

Systems and methods for affecting an appearance of a deposited weld bead by modulating one or more welding parameters are disclosed. For example, an electrode negative portion of a welding output current may be modulated to affect the appearance of a deposited weld bead. Furthermore, a wire feed speed of a welding electrode may be synergistically modulated with an electrode negative portion of a welding output current to affect a deposited weld bead appearance. Two or more welding processes may be interleaved with each other at a specified modulation frequency to affect a deposited weld bead appearance. One or more welding parameters may be modulated based on a welding travel speed to provide a consistent appearance of a deposited weld bead.

In appended claims, the terms "including" and "having" are used as the plain language equivalents of the term "comprising"; the term "in which" is equivalent to "wherein." Moreover, in appended claims, the terms "first," "second," "third," "upper," "lower," "bottom," "top," etc. are used merely as labels, and are not intended to impose numerical or positional requirements on their objects. Further, the limitations of the appended claims are not written in means-plus-function format and are not intended to be interpreted based on 35 U.S.C. §112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. An arc welding power source for generating an arc between a consumable welding electrode and a welding workpiece, the power source comprising:
   a switching power supply;
   a waveform generator; and
   a controller operatively connected to the waveform generator and the switching power supply,
   wherein the controller, the waveform generator, and the switching power supply are configured to generate a cyclical welding output current having an electrode positive portion and an electrode negative portion, and
   wherein the controller is configured to cyclically vary at least one characteristic of the electrode negative portion or the electrode positive portion of the generated welding output current between a first state and a second state, which is different from the first state, to affect an appearance of a deposited weld bead from the consumable welding electrode onto the workpiece during a welding process.

2. The arc welding power source of claim 1, wherein the first state corresponds to a first weld energy input state and the second state corresponds to a second weld energy input state providing more energy than the first weld energy input state.

3. The arc welding power source of claim 1, wherein the at least one characteristic of the electrode negative portion or the electrode positive portion of the welding output current includes one or more of an amplitude, a duration or pulse width, a rising edge slope, a falling edge slope, or a waveform shape.

4. The arc welding power source of claim 1, wherein the welding process comprises an aluminum or an aluminum alloy gas metal arc welding (GMAW) process.

5. The arc welding power source of claim 1, wherein the generated welding output current is in the first state for a first predetermined number of cycles of the welding output current and in the second state for a second predetermined number of cycles of the welding output current.

6. The arc welding power source of claim 1, wherein the varying between the first state and the second state is based on a travel speed of the welding process.

7. An arc welding system for generating an arc between a consumable welding electrode and a welding workpiece, the system comprising:
   a power source configured to generate the arc between the consumable welding electrode and the welding workpiece;
   a wire feeder configured to feed the consumable welding electrode toward the welding workpiece,
   wherein the power source is configured to command the wire feeder to operate at a wire feed speed and configured to generate a cyclical welding output current having an electrode positive portion and an electrode negative portion, and
   wherein the power source is further configured to cyclically vary at least one characteristic of the electrode negative portion or the electrode positive portion of the welding output current between a first state and a second state, which is different from the first state, and configured to vary the wire feed speed in a correlated manner with the varying of the at least one characteristic to affect an appearance of a deposited weld bead from the consumable electrode onto the workpiece during a welding process.

8. The arc welding system of claim 7, wherein the first state corresponds to a first weld energy input state and the second state corresponds to a second weld energy input state providing more energy than the first weld energy input state.

9. The arc welding system of claim 8, wherein the first weld energy input state occurs during times of a first wire feed speed, and the second weld energy input state occurs during times of a second wire feed speed, wherein the second wire feed speed is faster than the first wire feed speed.

10. The arc welding system of claim 7, wherein the at least one characteristic of the electrode negative portion or the electrode positive portion of the welding output current includes one or more of an amplitude, a duration or pulse width, a rising edge slope, a falling edge slope, or a shape.

11. The arc welding system of claim 7, wherein the welding process comprises an aluminum or an aluminum alloy gas metal arc welding (GMAW) process.

12. The arc welding system of claim 7, wherein the welding output current is in the first state for a first predetermined number of cycles of the welding output current and in the second state for a second predetermined number of cycles of the welding output current.

13. The arc welding system of claim 7, wherein the varying between the first state and the second state is based on a travel speed of the welding process.

14. An arc welding power source for generating an arc between a consumable welding electrode and a welding workpiece, the power source comprising:
   a switching power supply;
   a waveform generator; and
   a controller operatively connected to the waveform generator and the switching power supply,
   wherein the controller, the waveform generator, and the switching power supply are configured to generate a welding output current that cycles between a short arc welding process and a pulse welding process at a defined process cycle frequency to affect an appearance of a deposited weld bead from the consumable welding electrode onto the workpiece.

15. The arc welding power source of claim 14, wherein the pulse welding process is a higher heat transfer welding process than the short arc welding process.

16. The arc welding power source of claim 14, wherein the controller is configured to change the process cycle frequency to affect a resultant heat input to a weld.

17. The arc welding power source of claim 16, wherein the process cycle frequency increases as a travel speed of a welding process increases.

18. An arc welding system for generating an arc between a consumable welding electrode and a welding workpiece, the system comprising:
   a power source configured to provide a cyclical welding output current to generate the arc between the consumable welding electrode and the welding workpiece;
   a wire feeder operatively connected to the power source and configured to feed the consumable welding electrode at a wire feed speed; and a welding tool operatively connected to the wire feeder to accept the consumable welding electrode and direct the consumable welding electrode toward the welding workpiece, wherein the power source is configured to vary the wire feed speed and configured to cyclically vary a characteristic of at least a portion of the cyclical welding output current between a first state and a second state that is different from the first state in a synergistic manner with the varying of the wire feed speed based on a selected travel speed of the welding tool to affect an appearance of a deposited weld bead from the consumable welding electrode onto the workpiece, and wherein the cyclical welding output current comprises an electrode negative portion.

19. The arc welding system of claim 18, wherein the portion of the cyclical welding output current further comprises an electrode positive portion.

20. The arc welding system of claim 18, wherein a frequency at which the power source varies the characteristic of at least a portion of the cyclical welding output current between the first state and the second state increases as the travel speed increases.

21. The arc welding system of claim 18, wherein the wire feed speed increases as the travel speed increases.

22. An arc welding power source for generating an arc between a consumable welding electrode and a welding workpiece, comprising:

a switching power supply that is configured to generate a cyclical welding output current; and a controller operatively connected to the switching power supply, the controller is configured to adjust a frequency at which one or more welding parameters of at least an electrode negative portion of the welding output current is cyclically varied between a first state and a second state, which is different from the first state, based on a welding travel speed to affect an appearance of a deposited weld bead from the consumable welding electrode onto the workpiece.

23. The arc welding power source of claim 22, wherein the one or more welding parameters include one or more of an amplitude of a welding output current, a pulse width of hall the welding output current, a rising edge slope of hall the welding output current, a falling edge slope of hall the welding output current, or a waveform shape of hall the welding output current.

24. The arc welding power source of claim 22, wherein the frequency increases as the welding travel speed increases.

* * * * *

UNITED STATES PATENT AND TRADEMARK OFFICE
CERTIFICATE OF CORRECTION

PATENT NO. : 9,676,051 B2
APPLICATION NO. : 13/777343
DATED : June 13, 2017
INVENTOR(S) : James E. Hearn et al.

Page 1 of 1

It is certified that error appears in the above-identified patent and that said Letters Patent is hereby corrected as shown below:

In the Claims

In Column 12, Claim 23, Line 18 please delete "hall the" and add -- the --

In Column 12, Claim 23, Line 18 please delete "of hall" and add -- of --

In Column 12, Claim 23, Line 19 please delete "hall"

In Column 12, Claim 23, Line 20 please delete "hall"

Signed and Sealed this
Twenty-first Day of January, 2020

Andrei Iancu
*Director of the United States Patent and Trademark Office*